Nov. 17, 1936.   C. CHRISTENSEN   2,061,393
DISPLAY DEVICE
Original Filed April 13, 1932   2 Sheets-Sheet 1
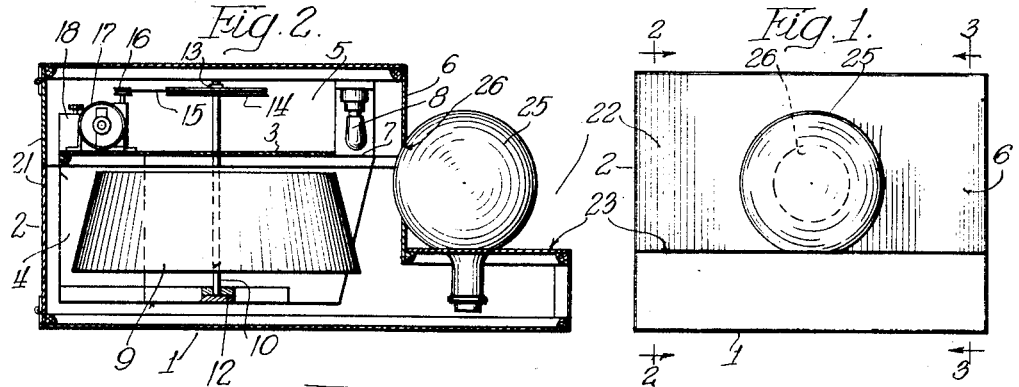
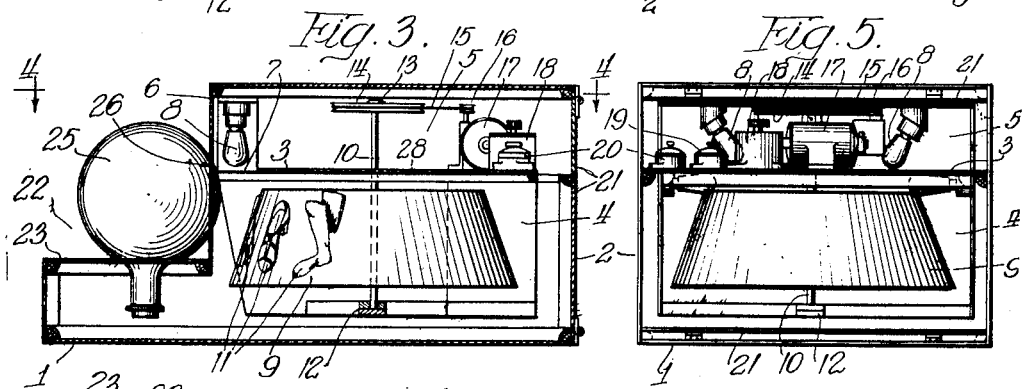
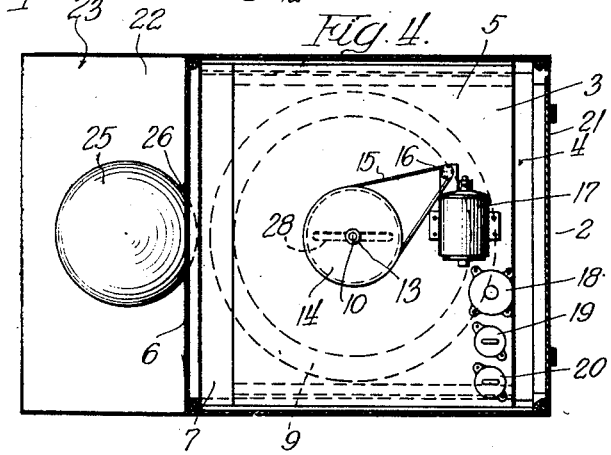
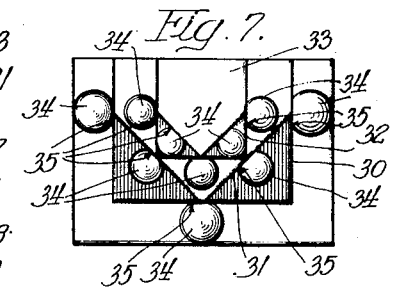
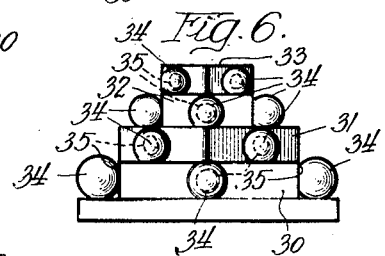
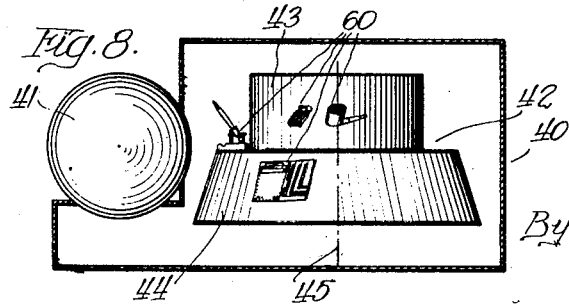
Inventor:
Christen Christensen.

Nov. 17, 1936.   C. CHRISTENSEN   2,061,393
DISPLAY DEVICE
Original Filed April 13, 1932   2 Sheets-Sheet 2
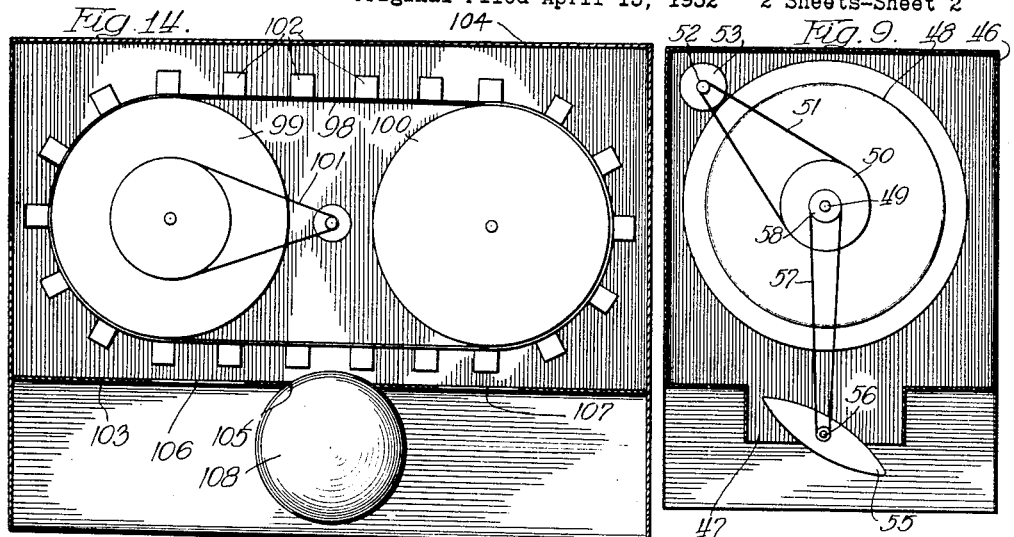
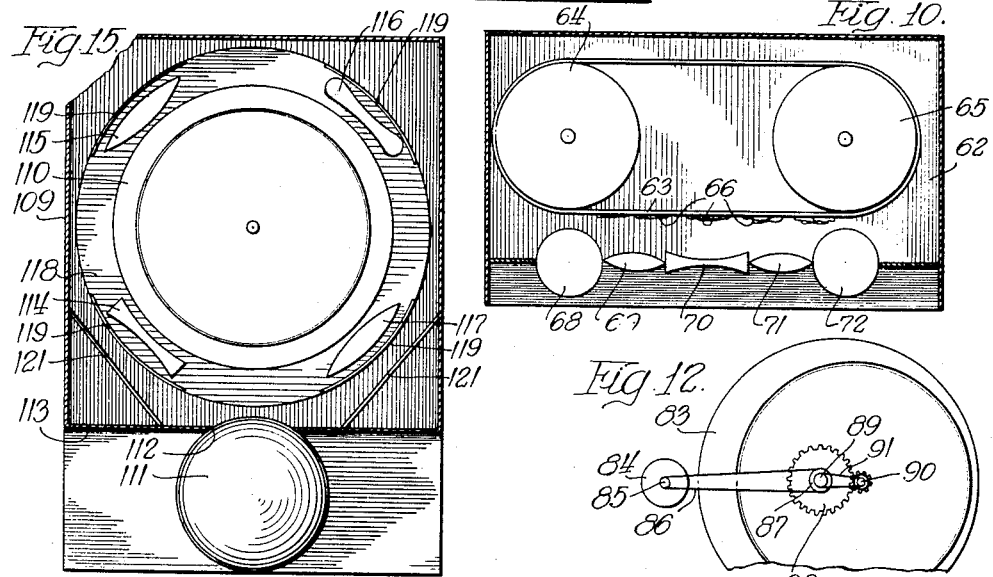
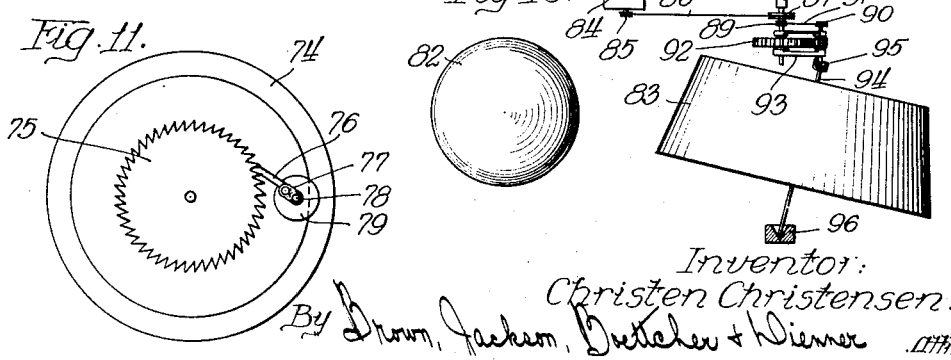
Inventor:
Christen Christensen.

Patented Nov. 17, 1936

2,061,393

UNITED STATES PATENT OFFICE 2,061,393

DISPLAY DEVICE

Christen Christensen, Maywood, Ill.

Application April 13, 1932, Serial No. 604,918
Renewed November 7, 1934

17 Claims. (Cl. 88—1)

This invention relates to display devices, and may be characterized as an improvement in display devices of the type illustrated and described in Patent No. 1,913,415, dated June 3, 1933.

As pointed out in the above application, the successful use of devices of this sort depends mainly upon the ability to attract and retain the attention of the public. The device of the above application is so constructed and arranged that the material which is to be viewed by the public is presented in a manner calculated to attract attention and retain the interest of those viewing the device.

The device of my present invention is further adapted to attract and retain the attention of those viewing the device, and it is constructed and arranged to afford a wide range of different displays of the material to be viewed by the public.

The present invention preferably uses a convergent lens which, as in the patent above referred to, is of such optical characteristics that the image or images of the material to be viewed appear to be in the lens itself producing thereby, as in that application, a novel effect and one which will attract and retain the interest and attention of the passerby. Auxiliary lenses or other devices may be employed in combination with this lens, and there may be one or a plurality of such lenses, as will hereinafter appear.

In the device of the present invention the carrier for the material to be viewed and the lens are preferably adjustable, one with respect to the other, or each with respect to each other for the purpose of adjusting, with respect to the focal length of the lens, the distance between the lens and the material to be viewed. In this manner the image or images of the articles on display may be caused to be direct and upright images, or indirect and inverted images, at will, or the distance between the lens and the carrier may be adjusted to such length that some of the articles will be seen direct and upright, while others are seen indirect and inverted at the same time. This provides a wide range of display with the same articles, and, as will hereinafter appear, the changes in the display may be made to occur automatically in the operation of the device, or they may be changed by manual adjustment from time to time. In this manner the interest of the public may be retained indefinitely.

The present invention contemplates also a carrier or drum having different portions of different sizes or diameters for supporting the articles to be displayed, the articles on one portion being viewed as direct and upright, and the articles on the other portion being viewed as indirect and inverted.

It is contemplated also to rotate the lens as well as the drum or carrier, and it is further contemplated to carry the articles past a plurality of lenses of different optical characteristics, and particularly having different shapes and focal lengths so that the images which are seen by the observer will be of different shapes and sizes. The lenses may be of hollow form filled with different colored fluids so that the images will be of different colors, and by means of lenses of different optical characteristics the articles can be shown as direct or indirect or in any combination, and the arrangement may be such that when the articles are seen through the lenses showing direct images the articles will be seen as traveling in the direction of movement of the carrier, whereas when seen through the lens showing indirect images, they will appear as moving in the opposite direction and counter to their actual movement with the carrier. In this manner a disappearing and enchanted impression arousing curiosity will be conveyed.

Another feature resides in means for imparting an interrupted or intermittent movement to the carrier, and a further feature resides in imparting a rocking motion to the drum or carrier simultaneously with its rotation. In this manner the same article on display will be shown in different positions and differently during successive revolutions of the carrier.

The articles on display may be carried past a lens or plurality of lenses through which any desired disfiguration or distortion, or a combination of disfigurations or distortions may be conveyed, and at the same time the articles may be moved past apertures permitting direct vision of the articles. As already pointed out, auxiliary lenses may be employed in combination with the main lens or a plurality of main lenses, and color screens may be provided, with the auxiliary lenses and color screens arranged to be moved into and out of position between the articles on display and the main lens for changing the shape, size or color of the articles. Mirrors are also contemplated for reflecting additional pictures upon the main lens to give the same a wider angle of visibility.

Further features of the present invention will appear from the following detailed description taken in connection with the accompanying drawings, in which:

Figure 1 is a front view of a device embodying the present invention;

Figure 2 is a vertical section taken substantially on the line 2—2 of Figure 1;

Figure 3 is a vertical section taken substantially on the line 3—3 of Figure 1;

Figure 4 is a plan section taken on the line 4—4 of Figure 3;

Figure 5 is a rear view with the doors open of the device shown in Figures 1 to 4, inclusive;

Figure 6 is a front view of a modification;

Figure 7 is a plan view of the modification shown in Figure 6;

Figure 8 is a more or less diagrammatic vertical section of another modification taken substantially medially between the opposite sides with the lens and drum in elevation;

Figure 9 is a more or less diagrammatic plan section showing another embodiment;

Figure 10 is a more or less diagrammatic plan section showing another embodiment;

Figure 11 is an end view of a drum for carrying the articles, and provided with means for imparting an interrupted or intermittent motion to the drum;

Figure 12 is an end view of the embodiment shown in Figure 13;

Figure 13 is a more or less diagrammatic front view of a drum provided with means for imparting a rocking motion to the drum simultaneously with the rotation thereof; and Figures 14 and 15 are more or less diagrammatic plan sections showing further embodiments of the invention.

Referring first to the embodiment shown in Figures 1 to 5, inclusive, 1 designates a suitable form of base which has mounted upon it a cabinet or housing 2 adapted to enclose the working parts of the device. The interior of the housing 2 has a horizontal partition 3 forming the lower drum compartment 4 and the upper driving compartment 5. The front of the partition 3 is spaced from the front wall 6 to provide a transverse opening 7, and suitably mounted along this opening are electric lamps 8, 8, the rays from which are directed down upon the forward portion of the drum 9.

The drum 9 is of generally frusto-conical form, and is mounted upon an upright shaft 10 to turn therewith. The articles to be displayed are fastened upon the frusto-conical surface or periphery of the drum as by pinning, nailing or otherwise fastening the same thereto, several of such articles being indicated at 11 in Figure 3. The shaft 10 is journaled at its lower end at 12, and passes up through the partition 3 and may be journaled at its upper end at 13. Within the upper compartment 5 the shaft 10 is provided with a grooved belt pulley 14, and a suitable driving belt 15 is trained about this pulley 14 and a relatively small pulley 16 driven by the electric motor 17. A rheostat indicated more or less diagrammatically at 18 is connected into the motor circuit (not shown) for the purpose of varying the speed of the motor and thereby the speed of rotation of the drum 9, and a pair of switches are indicated at 19 and 20, one for the motor and the other for the lights 8. The rear of the housing 2 is provided with door means indicated at 21, which door means may be hinged or otherwise arranged to be opened and closed at will.

The front of the housing 2 is stepped at 22 to set the wall 6 in from the front and provide a horizontal support for supporting the lens 25 in position so that the articles 11 on the drum 9 may be viewed therethrough. The wall 6 has an aperture 26 in which the lens 25 is disposed through which the articles are observed. The particular lens shown consists of a substantially spherical flask filled with water or other transparent liquid and having the neck thereof extending downwardly through an opening in the supporting surface 23.

For the purpose of adjusting the position of the drum 9 toward and away from the lens 25 to provide at will different distances, with respect to the focal length of the lens, between the lens and the drum, the bearing 12 for the lower end of the shaft 10 is slidable fore and aft in the housing 2, and where there is a bearing 13 for the upper end of the shaft 10, this bearing 13 is slidable fore and aft within the housing with the bearing 12. To permit movement of the shaft 10 and drum 9 toward and away from the lens 25, the partition 3 is slotted lengthwise of the housing as indicated at 28 in Figure 4. The belt 5 permits this adjustment of the position of the drum without interfering with the drive thereto, and if desired, a belt tightener may be employed. Instead of making the drum adjustable with respect to the partition 3, the partition 3, drum 9, and shaft 10 may be adjusted bodily fore and aft within the housing 2.

Any suitable liquid having the proper index of refraction and being substantially transparent may be used instead of water with which to fill the flask forming the so-called lens 25.

In operation the motor 17 is connected to any suitable source of power, and by this means the drum 9 will be rotated slowly. The lamps 8 may be connected to the same or to a different source of power. From Figure 3 it will be apparent that light emanating from the lamps 8 will illuminate the material carried on the peripheral surface of the drum 9, and will be reflected therefrom and concentrated by the lens 25 whereby to form observable images of the articles on the drum. With the articles in place upon the drum, rotation of the drum carries the articles slowly past the rear side of the lens 25, and the images of these articles are observable to the passerby through the lens 25. The contour and great depth or thickness of the lens, together with the wide aperture, seems to provide an excessive amount of spherical aberration which distorts the image in such a manner as to attract attention. As the articles come into view at one side of the lens and leave view at the opposite side the images are of relatively large size and of relatively great depth. The images appear to have great depth and to be within the lens itself, producing thereby a novel effect and one which will attract and retain the attention of the passerby. The provisions for obtaining this are fully disclosed herein and it seems unnecessary to attempt to go into the phenomena involved in the presentation to the observer. Applicant, however, reserves the right to do so as soon as he becomes fully aware of the exact action involved in the novel presentation which is provided by the means disclosed.

By arranging the drum 9 behind the lens 25 a distance greater than the focal length of such lens, the image or images formed by the lens will be real and inverted. Thus by inverting the articles on the surface of the drum, the images observed through the lens may be made to appear erect. By adjusting the position of the drum fore and aft of the housing 2, to shorten the distance between the drum and the lens so that it will be less than the focal length of the lens, the image or images will be erect and some of the articles may be disposed away from the lens a distance greater than the focal length of the lens, while other articles on the drum may be disposed away from the lens at a distance less than the focal length of the lens so that inverted and upright images will be observed at the same time.

By arranging the drum in position with the front of the drum spaced from the lens a distance less than the focal length of the lens, and the sides of the drum spaced from the lens distances greater than the focal length of the lens, the images of the articles at the sides of the drum will be inverted, whereas as the articles approach the front, direct or upright images will be produced. This may be reversed to produce the direct images at the sides and the inverted images at the front.

Instead of moving the drum the opening in the shelf 23, in which the neck of the lens 25 is mounted, may be elongated fore and aft of the housing so that the position of the lens may be adjusted with respect to the drum, or, if desired, the lens and drum may both be adjustable.

In the embodiment of Figures 6 and 7 the housing 30 has stepped and angularly disposed portions 31, 32, and 33, and a plurality of lenses 34 are disposed in staggered order on the respective step portions of the housing and at suitable apertures 35 therethrough, so that as the drum is rotated the articles thereon will be visible from the front of the housing through the different lenses 34. The step arrangement of the housing and the manner of disposing the lenses on the respective steps positions some of the lenses closer to the drum (not shown) within the housing than are other of the lenses. By making the disposition such that some of the lenses are disposed away from the drum a distance which is shorter than the focal length of the lens and other of the lenses away from the drum a distance which is greater than the focal length of the lens, upright images will be observed through some of the lenses while inverted images are observed simultaneously through other of the lenses. The drum may be of the type disclosed in the preceding embodiment, or it, too, may be stepped to dispose the smaller portions up within the reduced portions of the housing.

In the embodiment of Figure 8 the housing is indicated at 40, the spherical lens at 41, and the drum is illustrated in its entirety at 42. In this case the lens 41 is shown in the form of a solid ball or sphere of glass, and the drum 42 has an upper portion 43 of relatively reduced diameter and a lower generally frusto-conical portion 44 of larger diameter. The positioning of the drum 42 with respect to the lens 41 preferably is such that the reduced upper diameter positions the articles carried at the front of the drum away from the lens 41 a distance greater than the focal length of the lens whereby the articles at the front of the reduced drum part 43 will be seen through the lens as inverted, whereas the front of lower drum part 44 is positioned away from the lens 41 a distance less than the focal length of the lens whereby the articles on this lower enlarged part of the drum will be seen through the lens in direct and upright position. The axis of rotation of the drum 42 is indicated at 45, but the shaft and driving parts for the drum are omitted. Several articles to be displayed are shown fastened upon the different diameter drum parts 43 and 44 at 60.

In the embodiment of Figure 9 the housing is indicated at 46 and has the aperture or viewing opening 47. The drum indicated at 48 is fixed upon and turns with the shaft 49, which has a pulley 50. A driving belt 51 is trained about the pulley 50 and about a relatively small driving pulley 52 driven by the motor 53. The lens 55 is a convex lens but thinner than the spherical type of the other embodiment, and it has an axis 56 about which it is adapted to be turned. The shaft or other means forming the axis 56 has a small pulley, and a belt 57 is trained about this pulley and about a pulley 58 on the drum shaft 49 so that the lens 55 is rotated about its vertical axis 56 simultaneously with the rotation of the drum 48, it being understood that the articles to be displayed are again fastened or arranged upon the peripheral surface of the drum for movement past the rear of the lens 55. In this case the curvature of the drum with respect to the lens is adapted to produce upright images along one part of the drum and inverted images along another part.

In the embodiment of Figure 10 the housing is indicated at 62, and the carrier is shown in the form of an endless conveyor 63, trained and operable about drums 64 and 65, one of which may constitute a driving drum for the conveyor while the other may be an idler drum. In this case the articles 66 to be displayed are fastened to the outer surface of the conveyor 63, and instead of one lens there are a plurality of lenses 68, 69, 70, 71, and 72, the lenses 68, 69 and 70 being of different shape and focal length so that the articles will be seen through the lenses in different shapes and sizes as the conveyor travels behind the lenses.

Some or any combination of these lenses may be filled with different colored fluids to give different colors or different color combinations to the images, and the lenses may be of such focal characteristics that direct and inverted images are displayed at the same time through different lenses. The images seen through the lenses showing the articles direct and upright will appear as moving in the same direction as the conveyor 63, whereas the articles seen through the lenses showing inverted images will appear as moving in the opposite direction to that in which they are in reality moving, thereby providing a disappearing impression upon the observer.

In the embodiment of Figure 11 the drum 74 has a ratchet wheel 75 carried by the drum and rotatable with it, and a pawl 76 fastened to a crank 77 on the shaft 78 of the motor 79 gives the drum 74 an intermittent or interrupted motion. That is, the drum is given a partial rotation when the pawl is in cooperation with the ratchet, and as the pawl leaves the ratchet the rotation will cease until the pawl turns sufficiently to engage again the ratchet, whereupon a further advancement of the drum is provided.

Figures 12 and 13 show a mechanism for imparting a continuous but rocking motion to the drum so that the articles fastened to the peripheral surface of the drum for display will be shown in different positions upon successive revolutions of the drum. One suitable position for the lens is indicated more or less diagrammatically at 82 in Figure 13.

In this embodiment the drum is indicated at 83 and the driving motor is indicated at 84. The motor 84 has a motor pulley 85, and the driving belt 86 is trained about this pulley and a pulley 87 on a short shaft, this short or intermediate shaft having support at 88. 89 and 90 are auxiliary pulleys about which is trained a belt 91, and a spur gear mechanism 92 drives a crank arm 93, to the crank end of which the upper end of the drum shaft 94 is fulcrumed or pivoted at 95. The lower end of the shaft 94 is fulcrumed in a support 96 so that when the crank arm 93 is rotated the drum 83 will be rotated about the axis of the shaft 94, and at the same time the drum and shaft will be swung or rocked about the fulcrum support 96. It is understood that the belt drive 91 has driving connection down through the outer end of the crank arm with the upper end of the shaft 94 for the purpose of rotating the same about its axis. With this combination the lens provides for giving the images of the objects depth and the other attractive appearances already pointed out, and at the same time the articles are in different positions upon successive rotations of the drum, which further enhances the display.

In the embodiment of Figure 14 the carrier is again of the conveyor type comprising an endless conveyor belt 98 trained about drums 99 and 100. The drum 100 is an idler drum, and the drum 99 is driven from a motor through a driving belt 101 and suitable pulleys. The conveyor 98 has brackets or other suitable means for holding candy boxes, drug store articles, or other material for display indicated at 102, and the wall 103 of the housing 104 has the lens aperture 105 and a pair of side apertures 106 and 107 permitting direct vision of the articles therethrough as the conveyor moves the same along the back of the wall 103. The lens 108 is again of spherical form and is positioned at the aperture 105 to produce the novel effect already described.

In the embodiment of Figure 15 the housing is indicated at 109, the drum at 110, and the lens 111 is positioned at the aperture 112 in the wall 113 in position so that the articles may be viewed through the lens as they are moved across the back of the wall 113 by the movement of the drum or carrier 110. A plurality of auxiliary lenses 114, 115, 116, and 117 are carried by a suitable carrier which, for example, may be in turntable form indicated at 118, and this carrier may be provided with a plurality color screens 119. The auxiliary lens devices 114, 115, 116, and 117 are adapted to be moved successively or selectively to position directly behind the lens 111 and between it and the peripheral display surface of the drum 110, and these auxiliary lenses may be of different shapes to change the size and/or shape of the images of the articles which are seen through the lens 111. By arranging the auxiliary lens devices on a turntable support they may be brought successively or selectively to position behind the lens 111 by merely rotating this support to the desired position. The color screens 119 may be carried by the support 118 for movement with the auxiliary lens devices into position behind the main lens 111 and between the main lens and the auxiliary lens positioned between it and the drum, or these color screens may be separately carried and separately interposed into position between the main lens and the auxiliary lens or drum. A plurality of mirrors are indicated at 121 for reflecting additional pictures on the main lens 111 to give a wider angle of visibility.

It is to be understood that with this embodiment the drum 110 may be rotated continuously or intermittently as before, and the articles to be displayed are fastened or positioned upon the peripheral surface of the drum for movement across the back of the lens 111 by the rotation of the drum.

It is understood that instead of placing the electric lamp means outside the drum or carrier for the articles for display as illustrated in the embodiment of Figures 1 to 5, this lamp means may be disposed within the drum or carrier, which may be sufficiently transparent to permit the rays of light to pass therethrough, and this arrangement would be adapted particularly for displaying printed matter or the like. The electric lamp or illuminating means may be disposed within the endless carriers of the other embodiments in a similar manner.

It is to be understood further that instead of stepping the drum shown in Figure 8, in order to provide the different diameters, this drum may be of conical form with the inclination such that the articles on one part of the drum will be within the focal length of the lens, while articles on another part of the drum will be beyond the focal length of the lens. The inclination of the peripheral surface of the drum of the embodiment of Figures 1 to 5 may be such as to provide this simultaneous display of direct and inverted images through the lens.

I do not intend to be limited to the precise details illustrated or described.

I claim:

1. In a display device the combination of a positive lens formed of essentially a complete refracting sphere, and means for moving material for display across the back of the lens in a path having portions at distances within and beyond the focal length of the lens to form simultaneously inverted and upright images of the material by means of said lens and to change the character of said images in the movement of the material in said path.

2. In a display device the combination of a positive lens formed of essentially a complete refracting sphere, and means for moving material for display across the back of the lens in a path having portions at distances within and beyond the focal length of the lens to form simultaneously inverted and upright images of the material by means of said lens and to change the character of said images in the movement of the material in said path, the means for moving the material being operated to move said material at a continuous rate.

3. In a display device the combination of a positive lens formed of essentially a complete refracting sphere, and means for moving material for display across the back of the lens in a path having portions at distances within and beyond the focal length of the lens to form simultaneously inverted and upright images of the material by means of said lens and to change the character of said images in the movement of the material in said path, the means for moving the material being operated to move said material at a continuous rate and in an endless path.

4. In a display device the combination of a positive lens formed of essentially a complete refracting sphere, and means for moving material for display across the back of the lens at distances within and beyond the focal length of the lens to form inverted and upright images of the material by means of said lens, the means for moving the material being operated to move said material with an intermittent advancing movement.

5. In a display device the combination of a lens, and means for moving material for display across the back of the lens in a path having portions at distances within and beyond the focal length of the lens to form simultaneously inverted and upright images of the material by means of said lens and to change the character of said image in the movement of the material in said path, the means for moving the material being operated to move said material in an endless path and to rock the path of movement of said material.

6. In a display device the combination of a positive lens formed of essentially a complete refracting sphere, means for moving material for display across the back of said lens means, and means for adjusting the distance between said lens means and said last means to form inverted or upright images of the material for display or a combination of inverted and upright images of said material.

7. In a display device the combination of a movable carrier for articles for display, means to move said carrier, means acting as a positive lens formed of essentially a complete refracting sphere and positioned to permit the articles on the carrier to be viewed therethrough, and means for adjusting the distance between the carrier and said lens means to positions within and beyond the focal length of said lens means.

8. In a display device the combination of a movable carrier for articles for display, means to move said carrier, and means acting as a positive lens formed of essentially a complete refracting sphere and positioned to permit the articles on the carrier to be viewed therethrough, said carrier having portions of different sizes for supporting some of the articles for display within the focal length of the lens means and other of the articles beyond the focal length of said lens means.

9. In a display device a movable carrier for articles for display, means to move said carrier, and a plurality of positive lenses each formed of essentially a complete refracting sphere and means for supporting said lenses at different distances from said carrier, some within and some beyond the focal length of the respective lenses.

10. In a display device the combination of a positive lens formed of essentially a complete refracting sphere, means for moving material for display across the back of the lens at distances within and beyond the focal length of the lens to form inverted and upright images of the material by means of said lens, and an auxiliary lens positioned away from position between said first lens and the material and movable into position between said first lens and the material to change the images of the material.

11. In a display device the combination of a positive lens formed of essentially a complete refracting sphere, means for moving material for display across the back of the lens at distances within and beyond the focal length of the lens to form inverted and upright images of the material by means of said lens, and color screen means positioned away from between the lens and said material and movable into position therebetween.

12. In a display device the combination of a positive lens formed of essentially a complete refracting sphere, means for moving material for display across the back of the lens at distances within and beyond the focal length of the lens to form inverted and upright images of the material by means of said lens, and color screen and auxiliary lens means positioned away from between said first lens and the material and movable into position therebetween.

13. In a display device, a housing stepped at the front, a lens supported at said stepped front and adjacent an aperture in the housing, a partition dividing the interior of the housing into a lower compartment and an upper compartment, a carrier in the lower compartment for articles for display, means in the upper compartment for moving said carrier, said partition being spaced from the front of the housing, and lamp means disposed within said housing along said space.

14. In a display device, the combination of a positive lens formed of essentially a complete refracting sphere, and a movable carrier for articles for display, the carrier being formed and positioned to space the front of the same from said lens a distance less than the focal length of the lens and the sides of said carrier from said lens distances greater than the focal length of the lens whereby material positioned on the carrier for display is moved into and out of the focal length of the lens by the movement of the carrier.

15. In a display device, the combination of a relatively thick lens having a wide aperture, and means for moving material for display across the back of the lens in a path having portions at distances within and beyond the focal length of the lens to form simultaneously inverted and upright images of the material by means of said lens and to change the character of the images in the movement of the material in said path.

16. In a display device, the combination of a lens having a form to produce relatively great spherical aberration, and means for moving material for display across the back of the lens in a path having portions at distances within and beyond the focal length of the lens to form simultaneously inverted and upright images of the material by means of said lens and to change the character of the images in the movement of the material in said path.

17. In a display device, the combination of a relatively thick lens having a wide aperture, and a generally conical drum for supporting and moving material for display across the back of the lens in paths having portions at distances within and beyond the focal length of the lens to form simultaneously inverted and upright images of the material by means of said lens and to change the character of the images in the movement of the material in said paths.

CHRISTEN CHRISTENSEN.